US008250379B2

(12) United States Patent
Thom et al.

(10) Patent No.: US 8,250,379 B2
(45) Date of Patent: Aug. 21, 2012

(54) SECURE STORAGE OF TEMPORARY SECRETS

(75) Inventors: Stefan Thom, Snohomish, WA (US); Cristian Marius Ilac, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 371 days.

(21) Appl. No.: 12/577,846

(22) Filed: Oct. 13, 2009

(65) Prior Publication Data

US 2011/0087896 A1    Apr. 14, 2011

(51) Int. Cl.
*G06F 21/00* (2006.01)
(52) U.S. Cl. ....................................................... 713/193
(58) Field of Classification Search .................. 713/193
See application file for complete search history.

(56) References Cited

U.S. PATENT DOCUMENTS

| 7,210,166 | B2 | 4/2007 | Davis et al. | |
|---|---|---|---|---|
| 2002/0164034 | A1* | 11/2002 | Asano et al. | 380/278 |
| 2006/0155988 | A1* | 7/2006 | Hunter et al. | 713/164 |
| 2007/0256125 | A1 | 11/2007 | Chen et al. | |
| 2008/0059799 | A1 | 3/2008 | Scarlata | |
| 2008/0104706 | A1* | 5/2008 | Karp et al. | 726/26 |
| 2008/0152151 | A1 | 6/2008 | Pourzandi et al. | |
| 2008/0235804 | A1 | 9/2008 | Bade et al. | |
| 2009/0006859 | A1 | 1/2009 | Zimmer et al. | |
| 2009/0070596 | A1 | 3/2009 | Mantin et al. | |
| 2009/0172439 | A1 | 7/2009 | Cooper et al. | |
| 2009/0319772 | A1* | 12/2009 | Singh et al. | 713/153 |
| 2009/0328145 | A1 | 12/2009 | Berger et al. | |
| 2010/0023782 | A1 | 1/2010 | Prakash et al. | |

FOREIGN PATENT DOCUMENTS

| EP | 1273996 A2 | 1/2003 |
|---|---|---|
| WO | 2007044825 A2 | 4/2007 |
| WO | 2008090374 A2 | 7/2008 |

OTHER PUBLICATIONS

Hunter, Jamie, "System Integrity Team Blog", Retrieved at <<http://blogs.msdn.com/si_team/archive/2006/10/03/Multi_2D00_boot-Security.aspx>>, Oct. 3, 2006, pp. 2.
"International Search Report", Mailed Date: May 18, 2011, Application No. PCT/US2010/050275, Filed Date: Sep. 24, 2010, pp. 11.

* cited by examiner

*Primary Examiner* — Jason Gee

(57) ABSTRACT

Temporarily sensitive information can be stored in the non-volatile storage of a TPM, from which it can be securely, and irretrievably, deleted. Additionally, information stored in a TPM can secure information stored on communicationally disconnectable storage media such that, when communicationally disconnected, the information stored on such media is inaccessible. A whole volume encryption service key can be protected by a key stored in a TPM and, even if the protector remains accessible, the secure deletion of the key from the TPM prevents unauthorized disclosure of the whole volume encryption service key. Additionally, TPM stored data can be released only when a computing device is in a particular state, as determined by the PCRs. A hibernation image can be encrypted and the key stored with the TPM such that it is released to decrypt the image and restore active computing only if the state has not materially changed during hibernation.

14 Claims, 6 Drawing Sheets

SECURE STORAGE OF TEMPORARY SECRETS

BACKGROUND

As computing devices become more ubiquitous, a greater amount of sensitive information is stored upon, and utilized by, such computing devices. Consequently, users of such computing devices can invest a substantial amount of time and effort into securing such sensitive information. Among mechanisms for securing sensitive information, password-based mechanisms have become pervasive. As will be recognized by those skilled in the art, password-based protection technologies can rely upon encryption technologies to perform their protection. More specifically, password-based protection technologies traditionally encrypt a set of data and provide access to such data only upon the provision of an appropriate password. If an appropriate password is not provided, the data remains in encrypted form and, thereby, protected from unauthorized disclosure.

One technology that takes advantage of the pervasiveness and ease of use of password-based protection is whole volume encryption whereby all, or substantially all, of the data stored on a given volume is encrypted. Consequently, even if a malicious entity were to obtain physical access to the storage media upon which such data was stored, the data of such a volume would, nevertheless, remain protected since such data would have been stored in an encrypted form. As will be known by those skilled in the art, whole volume encryption technology traditionally relies upon one or more layers of keys to perform effective and efficient key management. Thus, for example, a "higher" layer key can be utilized to decrypt a "lower" layer key, and, ultimately, the lowest layer key can be utilized to decrypt the data, as stored on the storage media, itself. As a measure of protection, the decryption of one or more layers of the keys can be tied to the state of the computing device itself, such that, for example, if the storage media were to be removed from a computing device and communicationally coupled to a different computing device, the data could not be decrypted because the state of the computing device, to which the storage media was communicationally coupled, would have changed.

During the operation of a computing device, even a computing device that has been configured for secure operation, there may exist situations or circumstances during which it may be necessary to store sensitive information in an easily accessible form. For example, one or more keys utilized in a whole volume encryption mechanism, such as those keys whose decryption is traditionally tied to the state of the computing device, may need to be stored in an easily accessible form during updates to the computing device that can affect the state of the computing device in a material matter. The subsequent removal of such easily accessible information should ameliorate the potential security issues associated with storing such information in an easily accessible form.

Modern storage media, however, often utilize techniques and technologies which, while marking a particular set of data as deleted, do not actually destroy such data on the storage media itself. For example, modern magnetic-based storage media often comprise such storage capacity that data marked for deletion may not actually be overwritten and, thus unrecoverably destroyed, for a substantial amount of time. In the intervening time, the data can remain accessible via known data recovery mechanisms. In a similar manner, modern storage media utilizing solid state storage technologies often implement wear-leveling techniques. As a result of such techniques, modern solid state-based storage media may not actually overwrite data marked for deletion until a substantial amount of time after the data was supposed to be irretrievably removed. As with magnetic-based storage media, the failure of the solid-state based storage media to properly delete such sensitive information, can result in a substantially weaker security posture.

SUMMARY

Existing Trusted Platform Modules (TPMs) can comprise a small amount of secure storage capacity. Such TPM storage can be utilized to store some, or all, of a collection of sensitive information that is to be irretrievably removed. Unlike other modern storage media, the design specifications of a TPM specifically require that the TPM, when instructed to remove data from its storage, do so in a secure and irretrievable manner.

In one embodiment, a whole volume encryption mechanism can be suspended, such as during specific updating operations, by generating a protector of one or more keys associated with the whole volume encryption mechanism, and then storing the key that unlocks such a protector in the secure storage of the TPM. The generated protector can comprise metadata that can identify the location, within the secure storage of the TPM, in which the key that unlocks the protector is stored. Subsequently, such as upon completion of an updating operation, the protector and the key stored in the TPM can be deleted. Because the key will be irretrievably removed, the whole volume encryption can remain secure even if the generated protector itself is not irretrievably removed, such as if it was stored upon a storage medium whose storage mechanisms did not provide for immediate irretrievable removal of data that was requested to be deleted.

In another embodiment, information protected by a key, such as encrypted information, can be stored on a storage device that may not provide, or guarantee, a secure and irretrievable erasure. The key protecting such information can be stored in the secure storage of the TPM. If the protected information is to be irretrievably removed, the key can be securely, and irretrievably removed from the TPM and the protected information can, thereby, become inaccessible even if the storage device on which it was stored cannot guarantee its secure and irretrievable removable. Similarly, if the protected information is aliased, copied, or otherwise retained in some other form by the storage device, control over such information, including its irretrievable removal, can still be accomplished by virtue of the key singularly retained in the TPM.

In yet another embodiment, data stored on a storage medium can remain secure, and become inaccessible, if the storage medium is physically removed and, thus, communicationally disconnected from the computing device to which it was previously communicationally coupled. To provide for robust access of data by a proper computing device, a whole volume encryption mechanism can be utilized to encrypt data stored upon such a storage medium and one or more keys associated with the whole volume encryption mechanism could be protected by a key stored in the TPM, but to which access need not be limited, such as by, for example, tying access to the key to a particular configuration of the computing device. However, if the storage medium were to be physically stolen and, thus, communicationally disconnected from the computing device, such a key could not be retrieved from the TPM of that computing device, and, consequently, the data stored on the storage medium would remain encrypted and, thus, inaccessible.

In a further embodiment, aspects of a computing environment established on a computing device can be protected while the computing device is in a hibernated state. When a computing device is hibernated, the generated hibernation image can be encrypted independently of any other encryption mechanisms that may, or may not, be utilized by such a computing device. The key for decrypting such an encrypted hibernation image can be stored in the TPM and its release from the TPM to a subsequently requesting process can be tied to the particular configuration of the computing device when it was hibernated. Subsequently, when the operation of the computing device is resumed from hibernation, the encrypted hibernation image can be decrypted and accessed only if the configuration of the computing device has not materially changed while the computing device was hibernated. Additionally, the key for decrypting the encrypted hibernation image can be deleted from the TPM when the computing device is resumed from hibernation, thereby preventing multiple attempts to access and restore the encrypted hibernation image on a computing device whose configuration has materially changed.

This Summary is provided to introduce a selection of concepts in a simplified form that are further described below in the Detailed Description. This Summary is not intended to identify access control features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
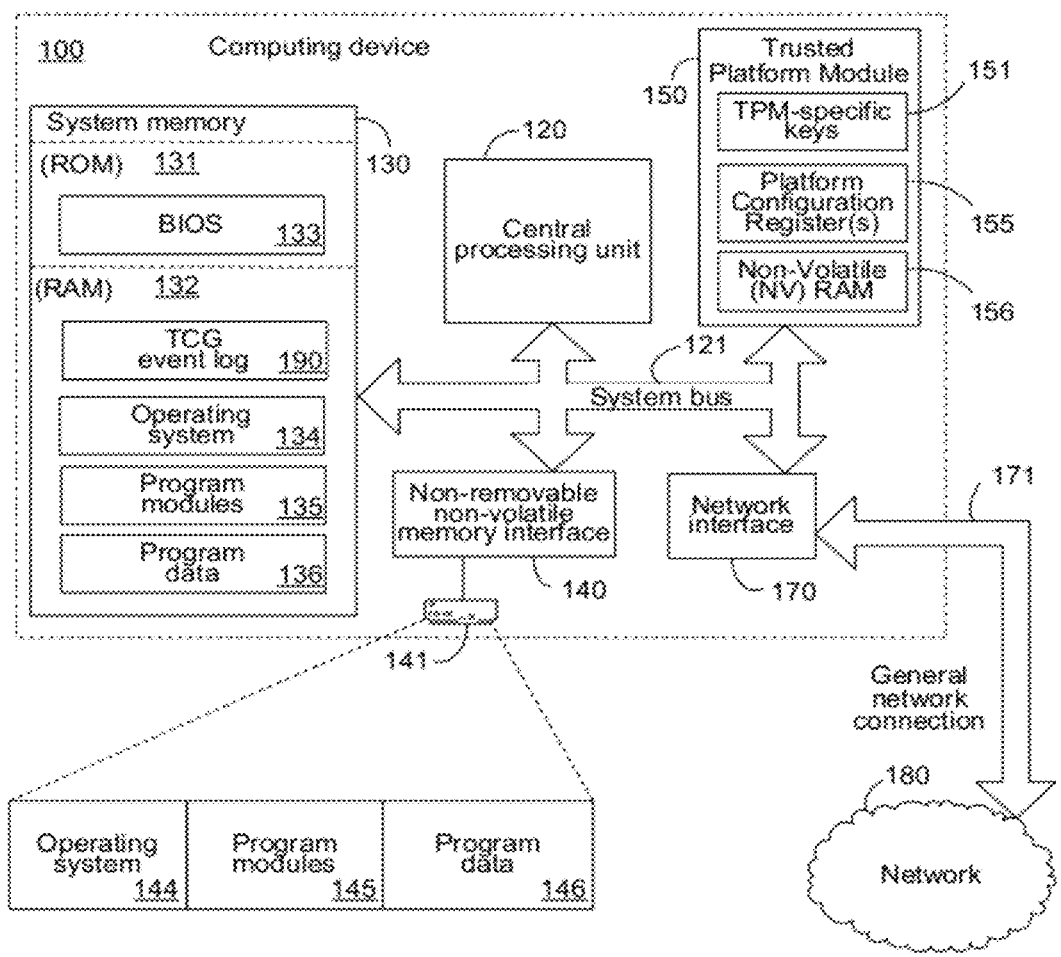
FIG. 1 is a diagram of an exemplary computing device comprising a TPM.

The following description relates to the utilization of an existing Trusted Platform Module (TPM) to store, or otherwise retain, sensitive information, including utilization of a TPM's ability to securely, and irretrievably, delete information stored in the TPM, and utilization of the TPM's ability to tie the release of sensitive information to a particular configuration of the computing device associated with the TPM. In circumstances during which it may be appropriate to suspend a whole volume encryption mechanism, one or more keys associated with the whole volume encryption mechanism can be encrypted in a protector, and the associated key to unlock such a protector can be stored at the TPM. Subsequently, when the whole volume encryption mechanism can be reactivated, the key to the protector can be securely, and irretrievably, deleted by the TPM. Similarly, information stored at the TPM can render inaccessible data that is stored upon storage media associated with a storage device that cannot guarantee a secure, and irretrievable, erasure, or in circumstances where such storage media becomes communicationally disconnected from the computing device. Additionally, processes that were active on a computing device can remain protected while the computing device is in a hibernated state when a hibernation image is encrypted and the key is stored in the TPM and its release is tied to a particular state of the computing device, such as can be expressed by the values of one or more Platform Configuration Registers (PCRs) of the TPM. Upon resuming active computing after hibernation, the key in the TPM can be utilized to decrypt the hibernation image if the state of the computing device has not materially changed during hibernation.

The techniques described herein focus on, but are not limited to, whole volume encryption mechanisms. Indeed, the teachings below are equally applicable to any secure information whose subsequent deletion is to be performed in an irretrievable manner, or any secure information whose access is to be limited by a communicational connection to a particular computing device. Consequently, the descriptions below are not meant to limit the enumerated embodiments to the specific exemplary circumstances referenced.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments linked through a communications network. In a distributed computing environment, program modules may be located in both local and remote memory storage devices.

With reference to FIG. 1, an exemplary computing device 100 is illustrated, comprising, in part, hardware elements referenced further in the methods described below. The exemplary computing device 100 can include, but is not limited to, one or more central processing units (CPUs) 120, a system memory 130, a Trusted Platform Module (TPM) 150, and a system bus 121 that couples various system components including the system memory to the processing unit 120. The system bus 121 may be any of several types of bus structures including a memory bus or memory controller, a peripheral bus, and a local bus using any of a variety of bus architectures. Depending on the specific physical implementation, one or more of the CPUs 120, the system memory 130 and the TPM 150 can be physically co-located, such as on a single chip. In such a case, some or all of the system bus 121 can be nothing more than silicon pathways within a single chip structure and its illustration in FIG. 1 can be nothing more than notational convenience for the purpose of illustration.

The TPM 150 can comprise encryption keys 151 for the encryption and decryption of information provided to it. Traditionally, the TPM 150 comprises an initial set of immutable public and private encryption keys that can be utilized, in a known and established manner, to obtain disposable public and private encryption keys. In addition, the TPM 150 can comprise Platform Configuration Registers (PCRs) 155 that can securely store values or other data uniquely associated with the state of the computing device 100. Such values are traditionally provided to the TPM 150 by the CPU 120 via the system bus 121. In some embodiments, only specific code executed by the CPU 120 would be permitted to send data to the TPM 150 that would modify the values stored in the PCRs 155. The TPM 150 can further comprise non-volatile storage capacity, such as the non-volatile RAM 156, within which the TPM can securely store at least a small amount of information provided to it, via the system bus 121, by other elements of the computing device, such as the CPU 120.

In addition to the elements described above, the computing device 100 also typically includes computer readable media, which can include any available media that can be accessed by the computing device 100. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

When using communication media, the computing device 100 may operate in a networked environment via logical connections to one or more remote computers. The logical connection depicted in FIG. 1 is a general network connection 171 to a network 180 that can be a local area network (LAN), a wide area network (WAN) or other networks. The computing device 100 is connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

Among computer storage media, the system memory 130 comprises computer storage media in the form of volatile and/or nonvolatile memory, including Read Only Memory (ROM) 131 and Random Access Memory (RAM) 132. A Basic Input/Output System 133 (BIOS), containing, among other things, code for booting the computing device 100, is typically stored in ROM 131. RAM 132 typically contains data and/or program modules that are immediately accessible to and/or presently being operated on by the processing unit 120. By way of example, and not limitation, FIG. 1 illustrates operating system 134, other program modules 135, and program data 136 as being resident in the RAM 132. The RAM 132 can also comprise data that can be relevant to the operation of the TPM 150, such as the TCG event log 190. In one embodiment, the TCG event log 190 can comprise a unique identification of all of the modules loaded or executed by the computing device 100 since power was applied or since it was last restarted; the same modules whose loading or execution can have resulted in the values currently maintained by the TPM 150 in one or more PCRs 155.

The computing device 100 may additionally include other removable/non-removable, volatile/nonvolatile computer storage media. By way of example only, FIG. 1 illustrates a hard disk drive 141 that reads from or writes to non-removable, non-volatile magnetic or solid-state media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 1, provide storage of computer readable instructions, data structures, program modules and other data for the computing device 100. In FIG. 1, for example, hard disk drive 141 is illustrated as storing operating system 144, other program modules 145 and program data 146. Note that these components can either be the same as or different from operating system 134, other program modules 135 and program data 136. Operating system 144, other program modules 145 and program data 146 are given different numbers hereto illustrate that, at a minimum, they are different copies.

Figure 2:
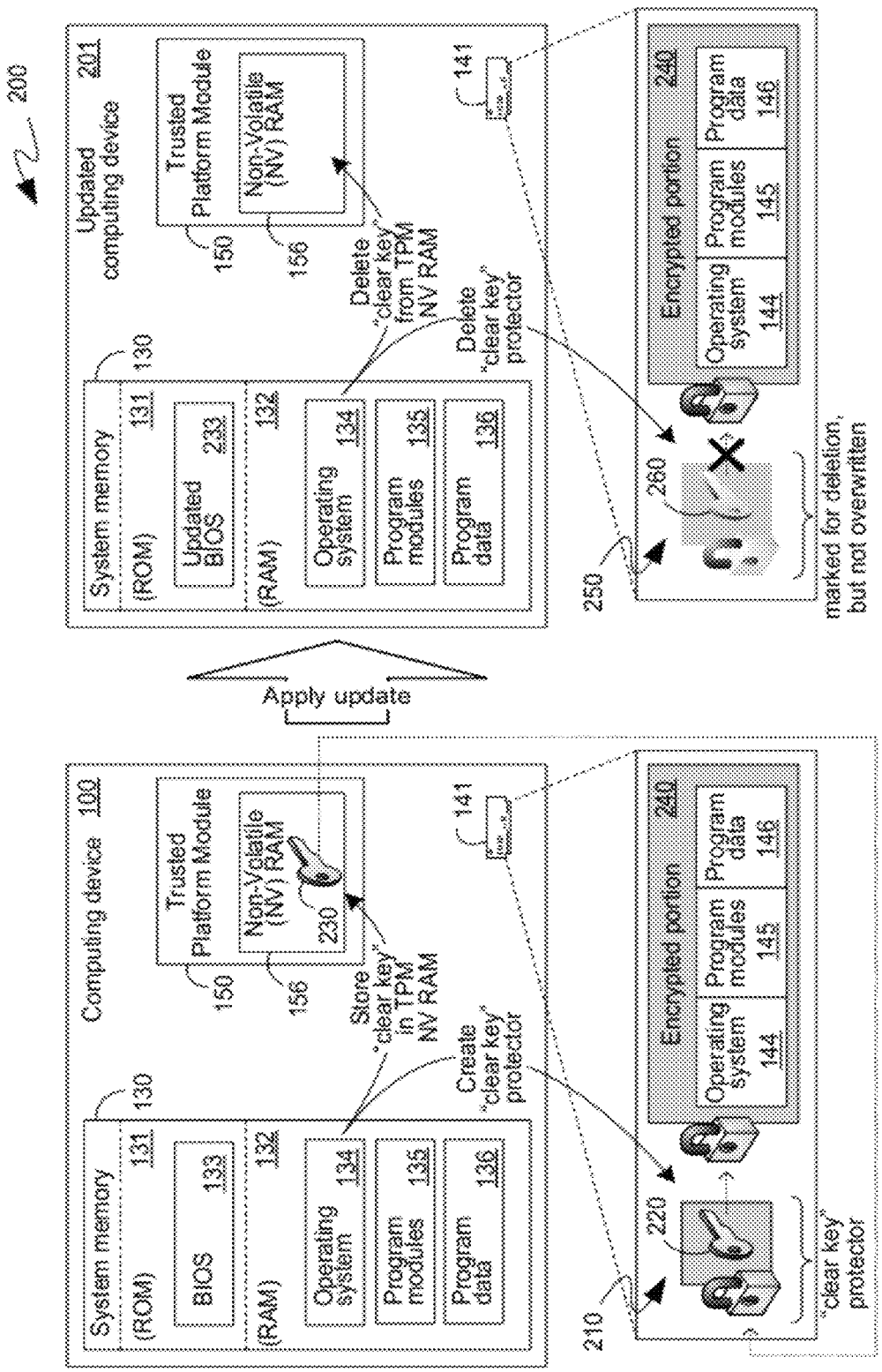
FIG. 2 is a block diagram of an exemplary utilization of a TPM to store, and subsequently securely delete, sensitive information stored for a defined period of time.

In one embodiment, the operating system 144, other program modules 145, and program data 146 can be stored on the hard disk drive 141, in an encrypted form. For example, the hard disk drive 141 can implement, or be utilized with, a whole volume encryption mechanism whereby all, or substantially all, of the data stored on the hard disk drive 141 can be stored in encrypted format. Turning to FIG. 2, in the exemplary system 200, the hard disk drive 141 is shown comprising an encrypted portion 240 that can include the at least substantial portions of the operating system 144, program modules 145, and program data 146. A key 220 can be utilized by the computing device 100, or by hardware associated with the hard disk drive 141, to decrypt data from the encrypted portion 240 and thereby enable the computing device to meaningfully access the operating system 144, the program modules 145 and the program data 146.

As will be known by those skilled in the art, a whole volume encryption mechanism can utilize multiple levels and layers of keys, such as the key 220. For example, to avoid having to re-encrypt, with a different key, data such as the operating system 144, the program modules 145, or the program data 146, the key 220 can be itself encrypted by another key. The encrypted version of the key 220, and any metadata associated with such an encrypted key, can be referred to as a "key protector". Again, as will be known by those skilled in the art, multiple key protectors can be generated for a single key, with each key protector being associated with a different authentication, or other security, mechanism. Thus, for example, the key 220, which can decrypt data stored within the encrypted portion 240 of the hard disk drive 141, can be encrypted into one key protector using a key associated with a user's password and can be encrypted into another key protector using a key associated with specific values of the PCRs 155. In such a manner, the encrypted portion 240 can be decrypted and accessed by the computing device 100 either if an authorized user enters their password, or if the values of the PCRs 155 indicate that the computing device is in a trusted state.

Multiple layers of keys can be utilized, as shown above, to provide for various access alternatives. In addition, multiple layers of keys can be utilized for other key management purposes, including, for example, to increase reliability, to provide security assurance, to increase performance, to provide for third-party assistance or support for users who may have, for example, forgotten their key, or other purposes. Therefore, in the descriptions below, references to a key, such as the key 220, associated with a whole volume encryption mechanism are intended to reference any layer of key and are not intended as exclusive references to only the particular key that directly decrypts the, for example, encrypted portion 240.

In certain circumstances, there may exist a need for a temporary suspension of the protections typically afforded by a whole volume encryption mechanism. For example, during updates that can impact the trusted state of the computing device 100, whole volume encryption may need to be suspended since it may be difficult, or impossible, to determine in advance appropriate values for the PCRs 155 and, without such a determination, a key that is required to enable access to the data stored in the encrypted portion 240, and which is associated with specific values of the PCRs, may not be accessible. To avoid such difficulties, whole volume encryption, or other security mechanisms, can be temporarily suspended in anticipation of changes to the computing state by, for example, generating a "clear key" protector 210 that can comprise both an encrypted version of the key 220 and the key needed to decrypt such an encrypted version of the key 220. As can be seen, such a "clear key" protector 210 can enable any process with access to the "clear key" protector to access the protected key itself, such as the key 220, which can, in turn, provide such a process with access to all of the data in the encrypted portion 240. Consequently, the presence of, for example, a "clear key" protector 210 on the hard disk drive 141 effectively suspends, or disables, the security aspects of the whole volume encryption implemented on such a drive. To re-enable the security aspects of a whole volume encryption mechanism, such as that implemented on the hard disk drive 141 of the system 200 of FIG. 2, the clear key protector 210 can be deleted from the hard disk drive in such a manner that it cannot be retrieved.

To provide for the irretrievable deletion of sensitive information, such as, for example, a clear key protector that can circumvent the security aspects of a whole volume encryption mechanism, specific information can be stored in the NV RAM 230 of a TPM 150. Thus, in one embodiment, as shown in the system 200 of FIG. 2, the operating system 134, or other process, can create a clear key protector 210 that can be stored on the hard disk drive 141 except that the key 230 associated with the clear key protector 210 can, instead of being stored with the clear key protector as described above, instead be stored in the NV RAM 156 of the TPM 150. The operating system 134 is, therefore, illustrated as providing data to two different storage media. In particular, the operating system 134 can store the clear key protector 210 on the hard disk drive 141 and can store the key 230, associated with the clear key protector 210, in the NV RAM 156 of the TPM 150.

The clear key protector 210 of the system 200 of FIG. 2 can comprise, rather than the key 230 itself, a pointer to the key 230 as it is stored in the TPM NV RAM 156. More specifically, in one embodiment, the clear key protector 210 can comprise the NV index at which the key 230 is stored in the NV RAM 156 of the TPM 150. As will be known by those skilled in the art, subsequent access of the clear key protector 210 will reveal the NV index stored therewith, thereby enabling the accessing process to request the key 230 from the TPM 150. In response, the TPM 150 can provide the key 230 to the requesting process and the requesting process can, with such a key 230, obtain the key 220 from the clear key protector 210 and access information in the encrypted portion 240.

As shown in the system 200 of FIG. 2, once the computing device 100 has been updated, in the form of the updated computing device 201, the operating system 134, or other relevant process, can delete the information that was generated to circumvent the security aspects of, for example, the whole volume encryption implemented on the hard disk drive 141. Thus, as shown, an instruction to delete the clear key protector 210 can be provided to the hard disk drive 141 and an instruction to delete the key 230 can be provided to the TPM 150. As indicated previously, the clear key protector 210 may not be irretrievably removed from the storage media of the hard disk drive 141. For example, if the hard disk drive 141 is comprised of magnetic storage media, then the clear key protector 210 may remain on such magnetic storage media until it is actually overwritten by other data provided for storage on the hard disk drive 141. While traditional magnetic storage media-based storage devices can implement a secure delete functionality that can randomly overwrite data marked for deletion, the nature of magnetic storage media is such that the recovery of previously stored information may be possible even if it has been overwritten a few times. Similarly, if the hard disk drive 141 is comprised of solid-state based storage media, then the clear key protector 210 may remain on such solid-state based storage media even after it has been marked for deletion. More specifically, solid-state based storage media is typically utilized in conjunction with wear leveling techniques that can avoid writing to certain segments more than any other segments. As a result, the data stored on segments, even data that was to be deleted, can remain in an accessible state for a substantial period of time.

Within the system 200 of FIG. 2, the clear key protector 250 and the key 260 are meant to illustrate the clear key protector 210 and protected key 220 that are in a deleted, but recoverable, state. However, as can be seen from FIG. 2, the irretrievable removal of the key 230 from the TPM NV RAM 156 can reestablish the security aspects of the whole volume encryption implemented on the hard disk drive 141. More specifically, if the key 230 were stored with the clear key protector 210, then, even after deletion, the clear key protector 250 could have been recovered from the storage media of the hard disk drive 141, and the key 260 could have been obtained and utilized to access information stored within the encrypted portion 240 of the hard disk drive 141. However, because the key 230 was stored within the TPM 150, which can conform to specifications requiring secure deletion of information stored within its NV RAM 156 when instructed to do so, recovery of the clear key protector 250 from the storage media of the hard disk drive 141 would not yield the key 260, since the key 230 needed to access the protector 250 and obtain the key 260 would no longer be available or retrievable. As a result, the information stored within the encrypted portion 240 can remain protected even without the secure, or irretrievable, deletion of the clear key protector 210.

While the above descriptions, and the illustrations provided in FIG. 2, reference a protector that protects the key 220, which is shown to be directly responsible for decrypting the encrypted portion 240, those of skill in the art will recognize that the above descriptions and illustrations are equally applicable to any of the multiple layers of keys traditionally generated by and used in conjunction with security mechanisms such as the whole volume encryption mechanism. Thus, for example, the protected key 220 need not directly be able to decrypt the encrypted portion 240, but can instead be an intermediate level of key that can, instead, decrypt another key that can then decrypt the encrypted portion 240.

Additionally, while the above descriptions, and the illustrations provided in FIG. 2, were specifically directed to the secure deletion of unprotected, or "clear key protectors" associated with a whole volume encryption mechanism, such as can be temporarily utilized during changes to the state of a computing device, such as the computing device 100, the principles described above are equally applicable to the secure deletion of any protected data stored on a storage medium associated with a storage device that cannot guarantee secure deletion. More specifically, if information is stored in a protected manner, such that some other data (that is traditionally, and herein, referred to as a "key"), can be utilized to gain access to that information, then to provide for the secure, and irretrievable, removal of such information, the protected information can be stored on any storage medium and the key can be stored in the TPM NV RAM 156, such as described in detail above. Even if the storage medium, and the storage device with which such storage media is associated, cannot provide for, or guarantee, a secure and irretrievable removal of the protected information, the secure and irretrievable deletion of the key that can be provided for by the TPM 150 can, in effect, such as that detailed above, result in the irretrievable removal of the protected information, irrespective of the abilities of the storage medium or device on which such protected information was stored.

In many cases, storage media, and the storage device with which such media is associated, is incapable of guaranteeing irretrievable removal because of hardware-based mechanisms that can alias, copy, duplicate or otherwise multiply the protected information as it is stored on the storage media such that the secure removal of one copy or aspect of the protected information may not be able to guarantee the secure removal of all such aspects or copies. In such cases, where protected information may be proliferated as part of the storage hardware itself, the retention of a singular key in the TPM NV RAM 156 can provide for a measure of singularity and control over the protected information. Additionally, although not required, should the protected information need to be irretrievably removed, such can be accomplished through the secure and irretrievable removal of the key from the TPM NV RAM 156, as detailed above.

Figure 3:
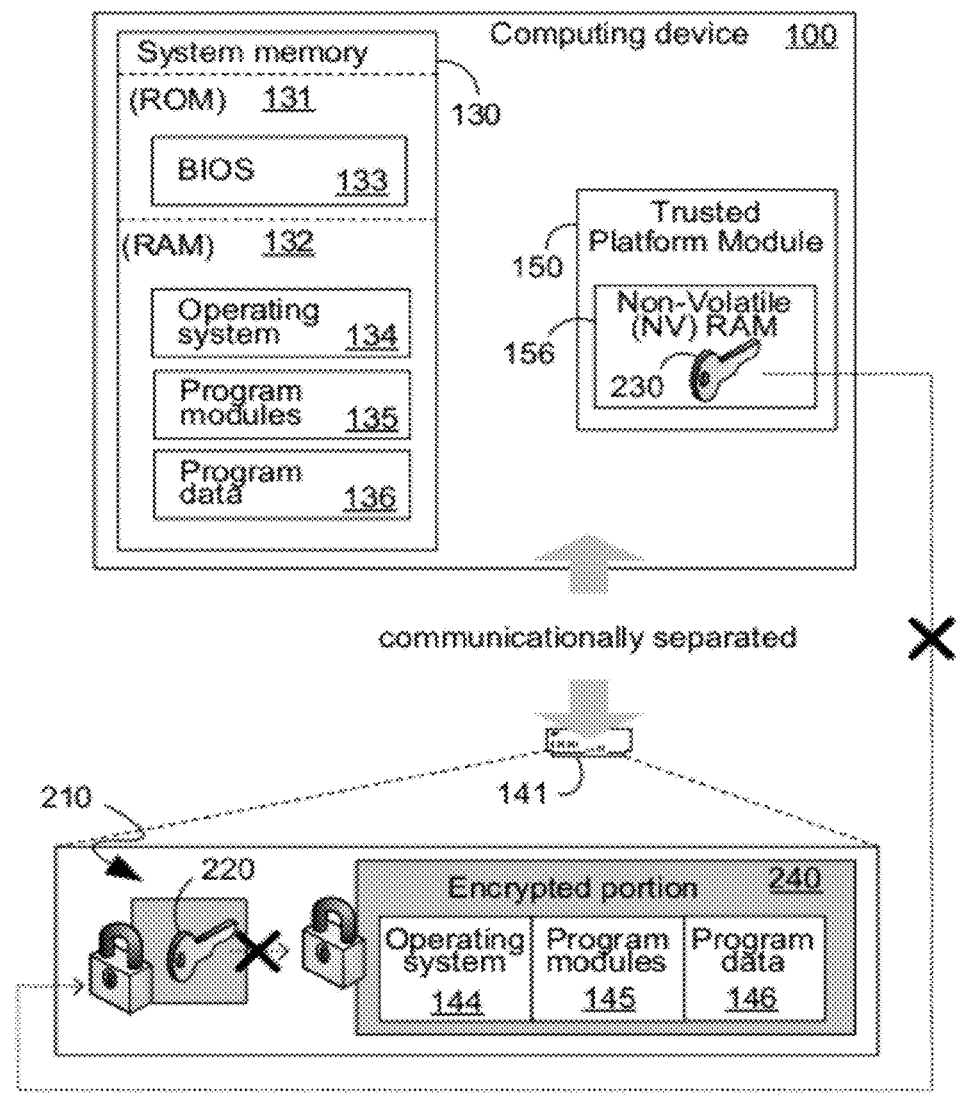
FIG. 3 is a block diagram of an exemplary utilization of a TPM to prevent data dissemination through physical theft of storage media.

In yet another embodiment, the storing of a key, such as the key 230, in the TPM NV RAM 156 can be utilized to provide a measure of protection against physical theft of a storage device, such as the hard disk drive 141, or, alternatively, protection against the theft of information from a storage device that was legitimately removed, such as for maintenance reasons. Turning to FIG. 3, a system 300 is shown comprising the computing device 100 with a hard disk drive 141 that can be physically and communicationally separated from the computing device. As described previously, a key protector 210, protecting a key 220, can be created and stored on the hard disk drive 141. As before, the key 220 can be utilized, either directly or indirectly, to decrypt and provide access to the encrypted portion 240 of the hard disk drive 141. By storing the key 230 in the TPM NV RAM 156 and providing, with the key protector 210, a pointer to the key 230, the computing device 100, and processes executing thereon, can, when seeking to access information stored in the encrypted portion 240 of the hard disk drive 141, follow the pointer from the key protector 210 to the location in the TPM NV RAM 156 at which the key 230 is stored, and can then obtain such a key from the TPM 150 and utilize it to ultimately access the encrypted portion of the hard disk drive.

Additionally, in one embodiment, access to the key 230 or, more specifically, to the particular index of the TPM NV RAM 156 at which the key 230 is stored, can be freely granted by the TPM 150, and need not be limited to specific values of the PCRs 155, or other like information associated with a state of the computing device 100. Consequently, processes executing on the computing device 100 can freely access information stored within the encrypted portion 240 of the hard disk drive 141 without regard to aspects of the state of the computing device that may be immaterial to the overall security of the computing device or the processes being executed by it. Such an environment can be especially useful in server computing devices that can traditionally be provided with hardware-based security, such as limited access physical environments, that can minimize the chances that the state of a server computing device 100 has changed in an insecure manner, but which should seek to maintain as much operational uptime as possible.

However, should such a computing device or, more specifically, components of such a computing device, be subject to theft, the above-described storage of necessary information in the TPM NV RAM 156 can prevent the utilization of information from the encrypted portion 240 of a stolen hard disk drive 141, or other like stolen storage media. Alternatively, should the hard disk drive 141 experience a failure that can necessitate the replacement of such a hard disk drive, the information stored within the encrypted portion 240 of the hard disk drive 141 can become inaccessible once the hard disk drive, or any other like storage media, is physically and communicationally separated from the computing device 100. In fact, the information stored within the encrypted portion 240 of the hard disk drive 141 can be sufficiently inaccessible, once the hard disk drive is communicationally separated from the computing device 100, that it can satisfy various security standards without requiring a costly and time-consuming erasure, or other destruction, of the hard disk drive or the information stored thereupon.

As can be seen from the system 300 of FIG. 3, if the hard disk drive 141 is communicationally separated from the computing device 100, such as, for example, if the hard disk drive 141 was physically removed from a server computing device 100, either as part of an authorized maintenance, or by theft, and is then subsequently communicationally coupled to a different computing device, processes executing on such a different computing device will not be able to access the key 230 stored in the NV RAM 156 of the TPM 150 of the computing device 100. Absent access to such a key 230, processes executing on a different computing device to which the hard disk drive 141 is subsequently communicationally coupled will not be able to obtain the key 220 from the protector 210, and will not, therefore, be able to meaningfully access the information stored within the encrypted portion 240 of the hard disk drive 141. Because information stored within the NV RAM 156 cannot easily be obtained from the TPM 150 by processes executing on computing devices external to the computing device 100, either through electronic communicational mechanisms, or through physical access of the TPM 150 itself, the storage of necessary information, such as the key 230, in the TPM NV RAM can provide, without adversely affecting the operational uptime of the computing device 100, a measure of security to data stored on storage media that can be communicationally disconnected from the computing device 100, including both security against theft and security against subsequent access of storage media replaced as part of an authorized maintenance.

While not specifically enumerated above, the TPM 150, as will be known by those skilled in the art, can limit the release of information stored within it, such as on the TPM NV RAM 156, to a particular state of the computing device 100, such as would traditionally be represented by the values of one or more PCRs 155. Therefore, in another embodiment, such gatekeeping functionality of the TPM 150 can be utilized to protect information while the computing device 100 may be in a vulnerable state, such as, for example, when the computing device is in a hibernated, or otherwise suspended, state.

Figure 4:
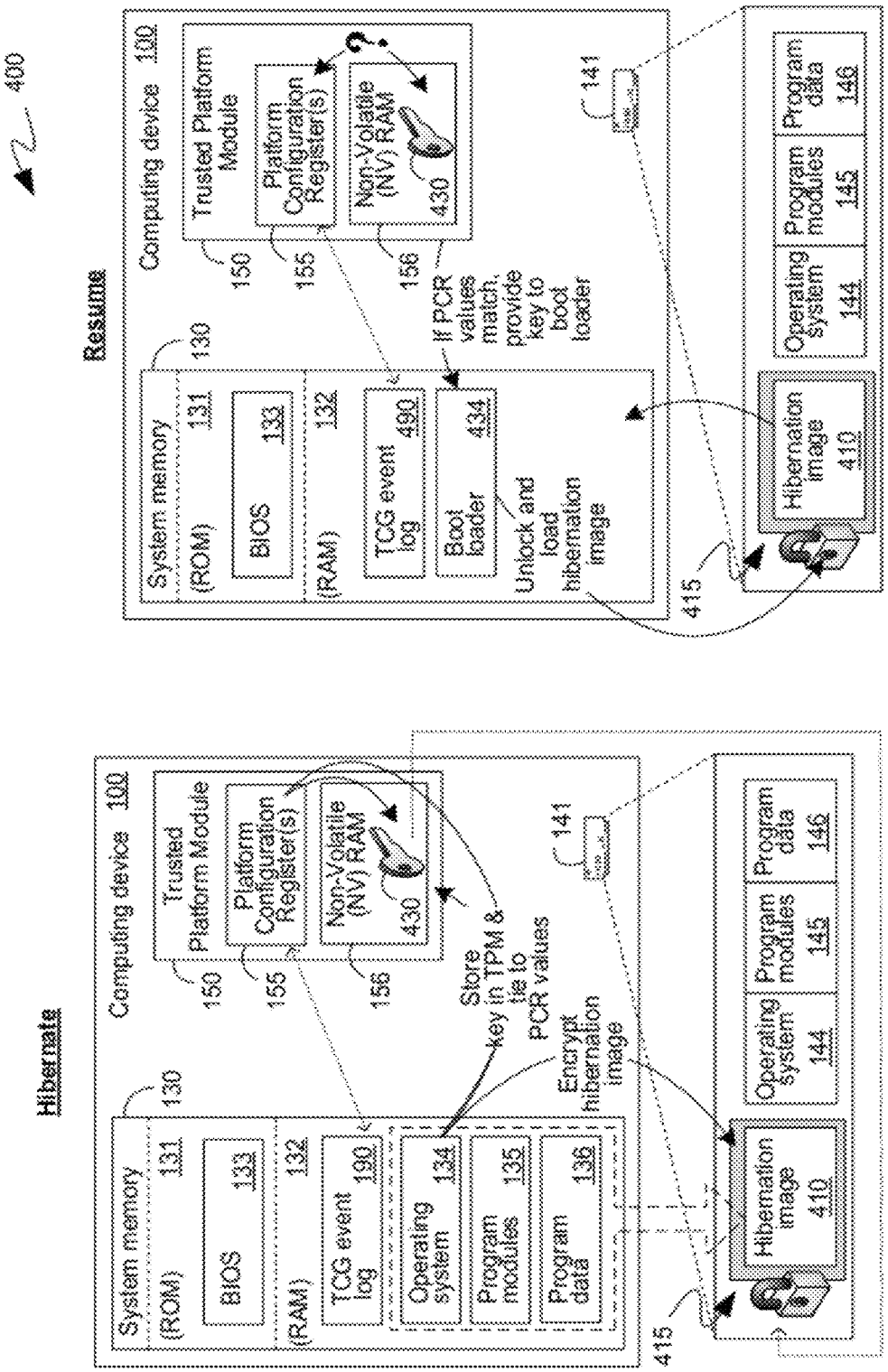
FIG. 4 is a block diagram of an exemplary utilization of a TPM to protect a computing device during hibernation.

Turning to FIG. 4, the system 400 illustrates an exemplary mechanism by which a hibernation image 410 can be protected while the computing device 100 is in a hibernated state. Initially, upon initiation of the hibernation of the computing device 100, a hibernation image 410 can be created. As will be known by those skilled in the art, and as illustrated by the dashed lines in FIG. 4, a hibernation image, such as the hibernation image 410, can comprise information associated with the state of the computing device prior to hibernation. For example, the hibernation image 410 can comprise the state of the operating system 134, program modules 135 and program data 136 as they existed in the RAM 132 of the computing device 100 at the time of hibernation such that, upon resuming execution from the hibernated state, the computing device 100 can load information from the hibernation image 410 into the RAM 132 and, thereby, enable the operating system and program modules to resume their prior actions or execution.

Because the hibernation image 410 can comprise information associated with processes and applications in an executing state, it can comprise information that may be available only after certain security-related actions may have already been performed. For example, certain aspects of the operating system 134 or the program modules 135 may have only been loaded into the RAM 132 after it was determined that the computing device 100 was in a trusted state. However, those aspects of the operating system 134 or the program modules 135 can now reside in the RAM 132 without any further protections. Were such information to be collected and stored as part of the hibernation image 410, subsequent access to the hibernation image, such as, for example, while the computing device 100 is in a hibernated state, could provide access to such information without the usual security restrictions intended to protect such information from unauthorized access.

Therefore, in one embodiment, to maintain the integrity of the hibernation image 410 and the state of the computing device 100, the hibernation image can be encrypted and stored as an encrypted hibernation image 415 as shown in the system 400 of FIG. 4. Although the system 400 of FIG. 4 illustrates the encryption of the hibernation image 410 as being performed by the operating system 134, those of skill in the art will recognize that such encryption could equally be performed by other processes including, for example, processes executing as part of the program modules 135. In addition to encrypting the hibernation image 410 and storing it as the encrypted hibernation image 415 on a storage device, such as, for example, the hard disk drive 141; the operating system 134, or other relevant processes, can further store, in the TPM NV RAM 156, the key 430 that can unlock the encrypted hibernation image 415, or otherwise provide access to the hibernation image 410.

In one embodiment, the key 430 can be stored in the TPM NV RAM 156 in conjunction with an instruction to the TPM 150 that the TPM is not to release, or otherwise provide, the key 430 unless one or more of the values of the PCRs 155 is, at the time the request for the key 430 is made, the same as it was at the time the computing device 100 was hibernated. More specifically, as indicated previously, the values of one or more of the PCRs 155 can be uniquely associated with the state of the computing device 100. Consequently, at the time that the computing device 100 is hibernated, the values of one or more of the PCRs 155 can reflect the state of the computing device 100 at the time of hibernation, and the state of the computing device as it should be when the computing device is resumed from hibernation. The values of one or more of the PCRs 155 can, therefore, be referenced to ensure that the state of the computing device 100 has not materially changed from the time it was hibernated until the time it is subsequently resumed, and, as such, release of the key 430 which, as indicated previously, can provide access to the hibernation image 410, can be tied to the values of one or more of the PCRs 155 at the time that the computing device is hibernated.

Subsequently, when the computing device 100 is resumed from hibernation, a boot loader 434, which, as will be known by those skilled in the art, can be a component of the operating system 134, can attempt to access the hibernation image 410 and load it into the RAM 132. Prior to being able to do so, however, the boot loader 434 can first obtain the key 430 from the TPM NV RAM 156. In the manner described above, the encrypted hibernation image 415 can include a reference to, for example, the NV index of the location of the key 430 in the TPM NV RAM 156. Such a reference can then be utilized by, for example, the boot loader 434 when it attempts to retrieve the key 430 from the TPM 150.

However, because the release of the key 430 by the TPM 150 can have been tied to the values of one or more of the PCRs 155, the TPM can first compare the values of the PCRs 155 at the time that the computing device was resumed from hibernation, and the key 430 was requested, to the values of the PCRs that were specified when the key 430 was stored in the TPM NV RAM 156. If one or more material aspects of the state of computing device 100 had changed from the time the computing device was hibernated, then the values of the one or more PCRs 155 to which release of the key 430 was tied would not be equivalent to their values at the time that the key 430 was stored in the TPM NV RAM 156, and the TPM 150 would not provide the key. Thus, for example, if malicious, or otherwise unknown or untrusted, computer-executable instructions, or other processes, were surreptitiously inserted in, or otherwise prepared for execution on, the computing device 100 while the computing device was in a hibernated state, then the execution, or activation, of such computer-executable instructions or processes would be recorded in the TCG event log 490, and would be reflected in the values of the PCRs 155. More specifically, the surreptitious insertion of such processes or instructions would cause the values of the PCRs 155 to be different than the values to which release of the key 430 was tied when the key 430 was stored in the TPM NV RAM 156 prior to hibernation, and would, as a result, cause the TPM 150 to refuse to provide the key 430 to a requesting process such as, for example, the boot loader 434.

As a result, the encrypted hibernation image 415 would not be able to be decrypted, and the computing device 100 would not be able to resume operation from hibernation with the new surreptitiously inserted instructions or processes. Instead, as will be recognized by those skilled in the art, the computing device 100 could be completely restarted, thereby removing, or otherwise neutering, the effect of any surreptitiously inserted instructions or processes and, as a result, protecting the computing device 100 and, more specifically, ensuring that sensitive information that may have been loaded and utilized by, for example, the operating system 134 or program modules 135, was not compromised.

Figure 5:
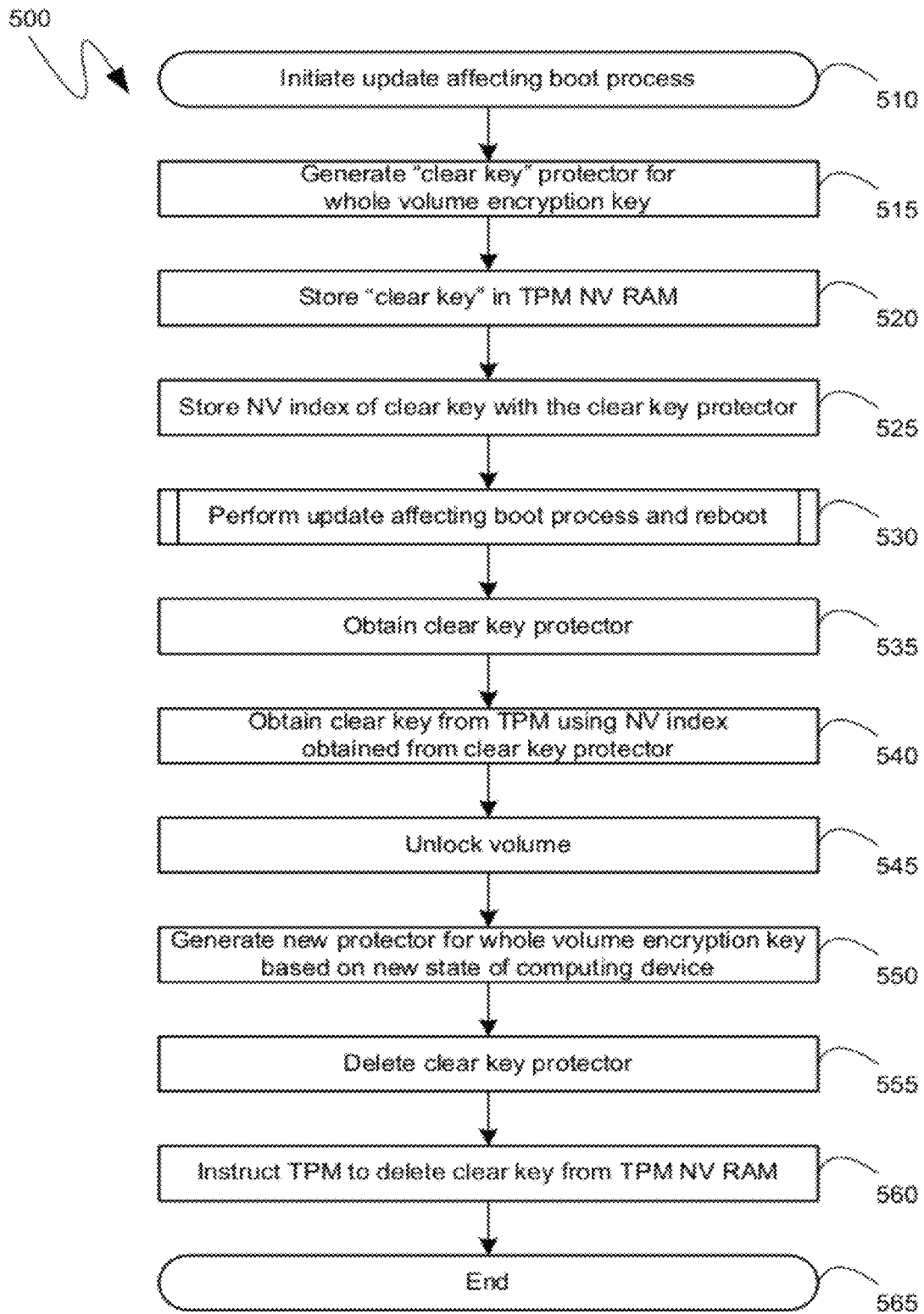
FIG. 5 is a flow diagram of an exemplary utilization of a TPM to store, and subsequently securely delete, sensitive information stored for a defined period of time.
Figure 6:
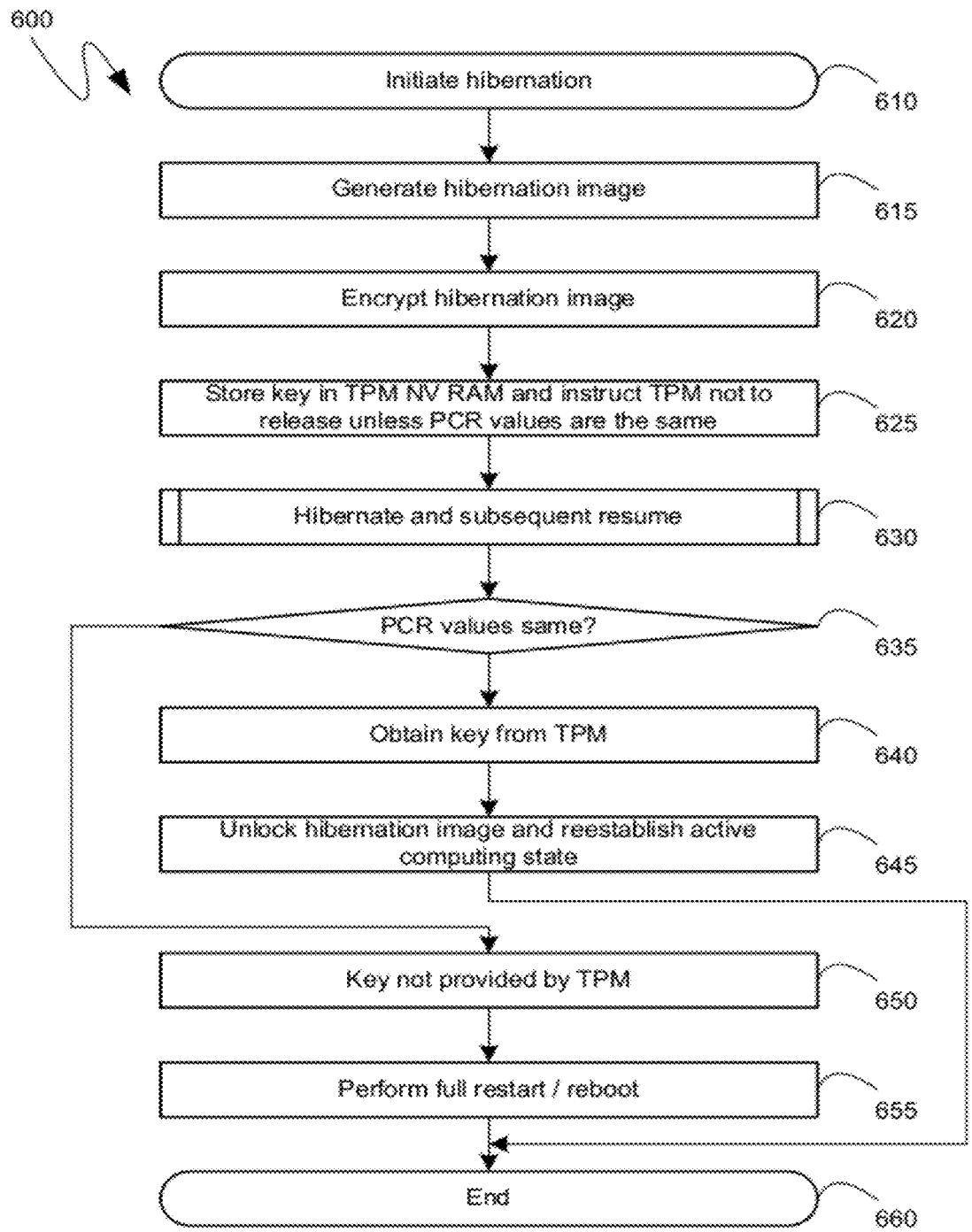
FIG. 6 is a flow diagram of an exemplary utilization of a TPM to protect a computing device during hibernation.

The operation of the above described mechanisms is further detailed by the flow diagrams of FIGS. 5 and 6. Turning to FIG. 5, the flow diagram 500 illustrates an exemplary series of steps that can be performed to provide for the secure, and unrecoverable, deletion of sensitive information that may need to be temporarily stored on a storage media, such as, for example, during an updating process. The steps illustrated in the flow diagram 500 are also, at least in part, applicable to the storing of information in a manner that such information is inseparably tied to a computing device, and utilizing that information to protect other information stored on a storage medium should such a storage medium be communicationally disconnected from the computing device.

Initially, at step 510, an update or other change to a computing device that can, for example, affect the booting process of the computing device, or otherwise materially change the operational state of the computing device, can be initiated. Subsequently, at step 515, a clear key protector can be generated for, for example, a key associated with a whole volume encryption mechanism. The "clear key" that can access the clear key protector generated at step 515 can be stored in the NV RAM of a TPM at step 520. A pointer to the key stored in the TPM's NV RAM, such as, for example, the NV index associated with the location in the TPM's NV RAM at which the key is stored, can be stored with, or otherwise associated with, the clear key protector at step 525. At step 530, one or more steps associated with the performance of the update, or other change that could materially impact the state of the computing device, can be performed. Also, as part of step 530, the computing device can be rebooted or otherwise restarted.

Subsequently, at step 535, the clear key protector generated at step 515 can be accessed as part of an effort to decrypt, or otherwise access, protected information such as, for example, information protected as part of a whole volume encryption mechanism. From the clear key protector accessed at step 535, a pointer, such as an NV index, can be obtained and utilized, at step 540, to obtain a key that can decrypt, or otherwise access, the key protected by the clear key protector. If the key was successfully obtained at step 540, then the clear key protector, obtained at step 535, can be accessed, and the resulting key can be utilized to unlock the volume at step 545.

As indicated previously, the update, or other change, performed at step 530, can have impacted existing mechanisms that tied keys associated with, for example, a whole volume encryption mechanism, to the state of the computing device. Consequently, after the volume protected by the whole volume encryption service is unlocked at step 545, one or more new protectors for keys that can access the encrypted volume can be optionally generated at step 550. Additionally, the clear key protector generated at step 515 can be deleted from the storage media upon which it was stored at step 555, and at step 560 the TPM can be instructed to delete the key from the TPM NV RAM. As described in detail above, even if the clear key protector that was supposed to have been deleted at step 555 was not, in fact, irretrievably removed, the instruction to the TPM to delete the key from the TPM NV RAM at step 560 can, in accordance with the specification to which the TPM conforms, cause the key to be securely, and irretrievably, deleted. As will be recognized by those skilled in the art, the deletion of the clear key protector at 555 and the instruction to the TPM to delete the key from the TPM NV RAM at step 560 need not necessarily occur in precisely the illustrated order of the flow diagram 500 of FIG. 5, and can, instead, occur at any time during, or after, the unlocking of the volume at step 545. Subsequently, at step 565, relevant processing can end.

As described in detail above, the steps illustrated in the flow diagram 500 of FIG. 5, need not all be performed, such as when a critical piece of information is stored within the TPM NV RAM for purposes of securing information on other storage media from theft, or other communicational separation. For example, the updating, or other change to the computing system, of step 530, and the corresponding generation of a new protector at step 550 and the subsequent deletion of the clear key protector from a storage medium, and the key from the TPM NV RAM, at steps 555 and 560, respectively, can be applicable to only specific embodiments and need not be performed when merely seeking to protect information on a storage medium in the case of theft or other communicational separation of a storage medium from the computing device.

Turning to FIG. 6, the flow diagram 600 illustrates an exemplary series of steps that can be performed in protecting a computing device during a hibernated, or otherwise suspended, state. Initially, as can be seen from the flow diagram 600, at step 610, a user or other process, can initiate hibernation or suspension of a computing device. Subsequently, at step 615, in accordance with traditional hibernation mechanisms, a hibernation image comprising, for example, relevant information from the RAM of the computing device, can be generated. At step 620, this hibernation image can be encrypted to protect it from access or modification while the computing device is in the hibernated, or otherwise suspended, state. The key associated with the encrypted hibernation image, and which can be utilized to decrypt the encrypted hibernation image, can be stored in the TPM NV RAM at step 625.

As described above, in providing the key to the TPM NV RAM at step 625, the TPM can be instructed to not release the key to a requesting process unless one or more of the values of the PCRs of the TPM are the same, at the time the request for the key is made, as they were at the time of step 625 when the computing device was being hibernated. Once the hibernation image has been encrypted at step 620, and the key has been stored in the TPM NV RAM at step 625, the computing device can complete hibernating and enter a hibernated state at step 630. At some subsequent point in time, also encompassed by step 630, the computing device can be instructed to resume active operation. A relevant process executing on the computing device at such a time, such as, for example, a boot loader or hibernation manager, can seek to obtain the key stored in the TPM NV RAM from the TPM and utilize that key to decrypt and access the hibernation image that was encrypted at step 620 so as to restore the computing device to the execution context in which it was executing immediately prior to hibernation.

At step 635, therefore, the TPM can check the current values of one or more of the PCRs against the values specified for release of the key. If, at step 635, the relevant PCR values are equivalent to those specified for release of the key, processing can proceed with step 640 and the provision of the key by the TPM to the requesting process. The requesting process can then, at step 645, utilize the key to unlock the encrypted hibernation image generated at steps 615 and 620, and reestablish an active computing state. The relevant processing can then end at step 660.

If, however, at step 635, the relevant PCR values are not equivalent to those specified for release of the key, processing can proceed with step 650, at which point the TPM can refuse to provide the key to the requesting process. Because, in such a case, the encrypted hibernation image cannot be decrypted, a computing device will not be able to resume active processing and can, at step 655, perform a full restart or otherwise shut itself down and perform a booting process at a subsequent point in time. Thus, if the state of the computing device had materially changed, such as, for example, if malicious, or otherwise unknown, computer executable instructions, or other changes to the computing device, had been surreptitiously inserted, or set up to be executed upon resumption of active processing, while the computing device was in a hibernated state, the TPM can refuse to provide the key, such as at step 650, and the performance of the full restart, or reboot, procedure at step 655 can erase, or otherwise nullify, any changes to the computing device surreptitiously performed while the computing device was in a hibernated state. The relevant processing can then end at step 660.

As can be seen from the above descriptions, mechanisms for securely storing and irretrievably erasing sensitive information by utilizing storage capabilities of the TPM have been presented. In view of the many possible variations of the subject matter described herein, we claim as our invention all such embodiments as may come within the scope of the following claims and equivalents thereto.

We claim:

1. One or more computer-readable storage media comprising computer-executable instructions for temporarily suspending an existing encryption mechanism that is tied to a state of a computing device comprising a Trusted Platform Module (TPM), the computer-executable instructions performing steps comprising:

encrypting a first key that is part of the existing encryption mechanism and which, as part of the existing encryption mechanism, was protected by the TPM such that the TPM would provide access to first key only if the state of the computing device was equivalent to a pre-defined state, the encrypting resulting in the temporary suspension of the existing encryption mechanism that is tied to the state of the computing device;

storing the encrypted first key on a storage medium that is communicationally coupled to the computing device, the storage medium being external to the TPM;

storing, on a storage medium that is internal to the TPM, a second key that is utilizable to decrypt the encrypted first key that is stored on the storage medium that is external to the TPM, wherein the storing is performed such that the second key can be obtained from the storage medium that is internal to the TPM independently of any particular state of the computing device;

storing, with the encrypted first key, on the storage medium that is external to the TPM, an index identifying a location on the TPM's storage medium at which the second key was stored;

subsequent to the storing the second key on the TPM's storage medium, requesting the second key from the TPM, the requesting specifying the index;

utilizing the second key, as obtained from the TPM in response to the requesting, to decrypt the encrypted first key; and subsequent to the utilizing the second key, as obtained from the TPM, to decrypt the encrypted first key, instructing the TPM to delete the second key from the TPM's storage medium, there restoring the existing encryption mechanism by preventing access to the first key even if the encrypted first key retrieved from the storage medium external to the TPM.

2. The computer-readable storage media of claim 1, wherein the computer-executable instructions for storing the second key on the TPM's storage medium comprise computer-executable instructions for instructing the TPM to provide the second key from the TPM's storage medium in response to the subsequent requesting of the second key irrespective of the values of any of the Platform Configuration Registers (PCRs) of the TPM.

3. The computer-readable storage media of claim 1, wherein the requesting the second key from the TPM subsequent to the storing of the second key on the TPM's storage medium occurs also subsequent to a change to the state of the computing device, the temporary suspension of the existing encryption mechanism having been performed in anticipation of the change to the state of the computing device.

4. The computer-readable storage media of claim 1 comprising further computer-executable instructions for rebooting the computing device after the storing of the encrypted first key, the storing of the index, and the storing of the second key, but prior to the requesting the second key.

5. The computer-readable media of claim 1, wherein the existing encryption mechanism is a whole volume encryption mechanism applied to the storage medium that is external to the TPM.

6. A method of temporarily suspending an existing encryption, mechanism that is tied to a state of a computing device comprising a Trusted Platform Module (TPM), the method comprising the steps of:

encrypting a first key that is part of the existing encryption mechanism and which, as part of the existing encryption mechanism, was protected by the TPM such that the TPM would provide access to the key only if the state of the computing device was equivalent to a pre-defined state, the encrypting resulting in the temporary suspension of the existing encryption mechanism that is to the state of the computing;

storing the encrypted first key on a storage medium that is communicationally coupled to the computing device, the storage medium being external TPM;

storing on a storage medium that is internal to the TPM, a second key that is utilizable to decrypt the encrypted first key that is stored on the storage medium that is external to the TPM, wherein the storing is performed such that the second key can be obtained from the storage medium that is internal to the TPM independently of any particular state of the computing device;

storing, with the encrypted first key, on the storage medium that is external to the TPM, an index identifying a location on the TPM's storage medium at which the second key was stored;

subsequent to the storing the second key on the TPM's storage medium, requesting the second key from the TPM, the requesting specifying the index;

utilizing the second key, as obtained from the TPM in response to the requesting, to decrypt the encrypted first key; and subsequent to the utilizing the second key, as obtained from the TPM, to decrypt the encrypted first key, instructing the TPM to delete the second key from the TPM's storage medium, thereby restoring the existing encryption mechanism by preventing access to the first key even if the encrypted first set of data was retrieved from the storage medium external to TPM.

7. The method of claim 6, wherein the storing the second key on the TPM's storage comprises instructing the TPM to provide the second key from the TPM's storage medium in response to the subsequent requesting of the second key irrespective of the values of any of the Platform Configuration Registers (PCRs) of the TPM.

8. The method of claim 6, wherein the requesting the second key from the TPM subsequent to the storing of the second key on the TPM's storage medium occurs also subsequent to a change to the state of the computing device, the temporary suspension of the existing encryption mechanism having been performed in anticipation of the change to the state of the computing device.

9. The method of claim 8 further comprising the step of rebooting the computing device after the storing of the encrypted first key, the storing of the index, and the storing of the second key, but prior to the requesting the second key.

10. The method of claim 6, wherein the existing encryption mechanism is a whole volume encryption mechanism applied to the storage medium that is external to the TPM.

11. One or more computer-readable storage media comprising computer-executable instructions for protecting a hibernation image, the computer-executable instructions performing steps comprising:

encrypting a hibernation image comprising contents from a volatile memory of a computing device comprising a Trusted Platform Module (TPM);

storing the encrypted hibernation image on a storage medium that is communicationally coupled to the computing device, the storage medium being external to the TPM;

storing a key, utilizable for decrypting the encrypted hibernation image, on a storage medium that is internal to the TPM such that the key can only be obtained from the TPM if a state of the computing device is equivalent to a pre-defined state;

storing, with the encrypted hibernation image, on the storage medium that is external to the TPM, an index identifying a location on the TPM's storage medium at which the key was stored;

subsequent to the storing the key on the TPM's storage medium and subsequent to a hibernation of the computing device, requesting the key from the TPM, the requesting specifying the index;

utilizing the key, as obtained from the TPM in response to the requesting, to decrypt the encrypted hibernation image; and instructing the TPM to delete the key from the TPM's storage media prior to restoring at least a portion of the decrypted encrypted hibernation image to the volatile memory of the computing device, thereby preventing the decrypted hibernation image from being successfully decrypted more than once.

12. The computer-readable media of claim 11, wherein the computer-executable instructions for storing the key on the storage medium that is internal to the TPM comprise computer-executable instructions for instructing the TPM to only provide the key if one or more Platform Configuration Registers (PCRs) of the TPM comprise expected values.

13. The computer-readable media of claim 12, wherein the expected values of the PCRs are equivalent to values of the PCRs when the hibernation image was generated.

14. The computer-readable media of claim 11, comprising further computer-executable instructions for rebooting the computing device if the requesting the key from the TPM fails.

* * * * *